Patented Apr. 21, 1942

2,280,600

UNITED STATES PATENT OFFICE 2,280,600

MASS CAPABLE OF SWELLING AND THICKENING AGENTS

Richard Müller and Harry Lee, Radebeul, near Dresden, Germany, assignors to Chemische Fabrik von Heyden A. G., Radebeul, near Dresden, Germany, a corporation of Germany No Drawing. Application April 21, 1938, Serial No. 203,340. In Germany April 24, 1937

14 Claims. (Cl. 260—124)

The present invention relates to the use of lignin as a mass and thickening agent practically insoluble in water, and possessing a limited and reversible swelling capacity.

Heretofore it has been reported that lignin was not capable of swelling in water (Staudinger, Zeitschrift für angewandte Chemie 1936, p. 324).

Furthermore, the following is known as to the formation of lignin by the action of acids on sulphite lye. When adding concentrated hydrochloric acid to sulphite lye, deposits are formed, which are only partly soluble in water (Lindsey and Tollens, Annalen der Chemie 267 (1892) p. 361; Stakelberg and Wechotko, Chemisches Zentralblatt 1937, I, 2300).

According to the statement of these authors, the lignin precipitated by concentrated hydrochloric acid is but partly soluble in water, giving a turbid liquid.

Now, we have found, that a good yield of products insoluble in water is obtained by starting not only from concentrated hydrochloric acid, but also from a sulphite lye of the highest possible concentration. For instance, when adding an excess of concentrated hydrochloric acid to, or introducing gaseous hydrochloric acid into the solution of 100 g. of a dry residue from sulphite lye in 150 cc. of water, flocky deposits are separated which are practically insoluble in water, heat being liberated and removed by cooling.

Instead of starting from raw sulphite lye, one may start from purified products, e. g. by acid, neutral or alkaline dialysis, the salt- or sugar-like products may be removed from the sulphite lye. The solutions purified by dialysis may also be turned into insoluble products by means of concentrated hydrochloric acid. Before precipitating with hydrochloric acid, one may also separate off the lime in form of gypsum by adding an equivalent amount of sulphuric acid.

The deposits may be separated from the mother lyes and washed by centrifuging, filtration or similar processes.

Furthermore, we have found that, when treating sulphite lye with aqueous or gaseous concentrated hydrochloric acid, the water-insoluble deposits begin to swell intensely while being washed and, above all, are capable of swelling again after drying. The swelling is limited, i. e. the masses have the technically valuable property of remaining gels and not turning to sols.

The degree of the capacity of swelling again depends on the type of drying. It is recommended to dry under conditions as mild as possible, e. g. in vacuo at 50° C., and in thin layers. The products are tasteless and odorless. The capacity of swelling remains unchanged even when the swelling and the drying processes are repeated several times, no matter if the products are made from raw or purified sulphite lye.

Example 1

If a graduated tube is filled with as much of the centrifuged, washed and dried sediment (about 0.6 g.) as to fill 1 cc after shaking it down, then covered with water, within a few minutes the mass will swell so as to fill a space of 8 cc. After about 20 minutes the volume is 10 ccm., the swelling thus being ten-fold.

It is further known that, when adding sulphuric acid to sulphite lye, sulphonic acids soluble in water are obtained. (Wiener Monatshefte der Chemie 39 (1938) p. 6.) Contrary to this statement we have found that, when adding concentrated sulphuric acid to concentrated sulphite lye, products insoluble in water will separate after some time. They are obtained for instance according to the following procedure:

200 g. of the dry residue of sulphite lye are stirred up with 300 g. of water and 700 g. of concentrated sulphuric acid. A viscous mass is obtained which after 4 days solidifies to form a stiff gel which may be cut. This is insoluble and may be crushed and purified in the usual way, e. g. by decanting and washing it in bags. The products are then dried carefully, e. g. by treating them in vacuo at a moderate temperature.

We have found the surprising fact, that the lignin thus obtained also has a limited and reversible swelling capacity.

Example 2

If 1 g. of the dry pulverized lignin obtained with sulphuric acid is filled into a graduated tube and shaken down, it fills a space of 1.2 cc. After adding water, the strongly swelling mass will take a volume of 15 cc. after a short time, the swelling thus being 12.5 times.

By causing these products to swell in an alkaline medium or by treating with alkalis or salts of alkaline reaction, e. g. sodium carbonate, borax etc., the swelling capacity may be increased.

Example 3

100 g. of lignin gel precipitated with hydrochloric acid, which when dried and pulverized fill 140 cc., show the following swelling volumes:

|  | cc. |
|---|---|
| (a) With pure water | 1600 |
| (b) With 0.1% sodium hydroxide solution | 2100 |
| (c) With diluted ammonia water | 2250 |

Example 4

10 g. of lignin gel precipitated by sulphuric acid swell to (a) 150 cc. in 500 cc. of pure water
(b) 160 cc. in 500 cc. of 1% sodium carbonate solution (c) 210 cc. in 500 cc. of 0.3% sodium hydroxide solution.

If the swollen masses are filtered, washed and dried again, the capacity of swelling is found to be 14.5 cc./g. for (a)
19.0 cc./g. for (b)
22.0 cc./g. for (c)

The treatment with alkali may be done while washing the gel. One gram of a product thus produced, washed free from alkali and carefully dried, swells from 1.2 to 17 cc.

It is especially remarkable that the considerable increase of swelling capacity caused by the treatment in alkali is kept up after washing out the alkali.

The products described also swell in polyhydric alcohols like glycerine, glycol or their substitutes.

*Example 5*

1 g. of lignin gel, precipitated by hydrochloric acid, purified by electro-filtration, dried and ground, which would swell to 20 cc. in water, is distributed in glycerine. After 30 hours it is swollen to a stiff mass of 13 cc. by volume. In glycol, under the same conditions this product swells to 18.6 cc.

*Example 6*

1 g. of gel precipitated by sulphuric acid, in glycerine swells from 1.2 to 10 cc.

*Example 7*

1 g. of gel precipitated by sulphuric acid, in glycol swells from 1.2 to 8 cc.

*Example 8*

1 g. of the gel as obtained according to Example 1 is distributed in a mixture of equal parts of glycerine and water. It forms a stiff mass of 21 cc. after swelling.

*Example 9*

1 g. of the gel as obtained according to Example 1 is distributed in a mixture of 2 parts by volume of glycerine and 1 part by volume of ethylalcohol. It swells to 14 cc. forming a stiff mass.

The lignin gel may thus be used as a substitute for other masses capable of swelling, for instance, starch, wheat flour, tragacanth, bassorin, sterculia gum and other kinds of gum of limited swelling capacity. They are useful as carriers for pharmaceuticals. On account of their swelling capacity, they distribute the active pharmaceuticals quickly and in an uniform way. They may also be used medically wherever the swelling serves the purpose of filling cavities of the body (e. g. in mixture with contrasting agents) in the radiography of the stomach and the intestines with inert masses. They are also useful as intestinal filling agents to obtain a laxative effect. Medically, they may also be used with great advantage as thickening agents e. g. for veterinary purposes wherever the colour of the pastes is essential. Therefore, by their aid it is possible to save e. g. glycerine, as is shown by the substitution of glycerine by the lignin gel in the deep-brown ichthynate-pastes:

*Example 10*

| | Grams |
|---|---|
| Ichthynate | 15 |
| Water | 30 |
| Lignin gel (made with hydrochloric acid) | 3 | give a very good homogeneous paste.

Furthermore we have found, that these swelling agents may well be used for thickening electrolyte solutions of dry cells in place of the wheat flour, tragacanth etc. as used heretofore. The pastes are exactly as stiff as those made with flour. Moreover it has been observed that the electric properties of the cells thus prepared are better.

It also happened that with the ammonium chloride cells, when using the new thickening agents, the disagreeable formation of the insoluble zinc chloride-ammonium chloride double salt, which is known to reduce the storage stability of the cells in an undesired way, does not take place. Fermentation processes, as they occur when using flour (Chemiker Zeitung 1937, p. 356), cannot happen with this lignin product.

*Example 11*

Cells of pocket lamp type with zinc chloride-ammonium chloride electrolyte are made, using in the outer electrolyte a paste containing 20% of a mixture consisting of 75% lignin gel and 25% good wheat flour. The electrolyte is stiff. The discharge results are:

| | | |
|---|---|---|
| Starting voltage, unloaded | volts | 5.01 |
| Starting voltage, loaded | do | 4.68 |
| Discharge time down to 2.5 volts | hours | 3¼ |
| Total discharge time down to 1.8 volts | do | 7 |

*Example 12*

Cells of pocket lamp type with zinc chloride-ammonium chloride electrolyte are made, using in the outer electrolyte a paste containing 20% lignin gel, but no wheat flour. The electrolyte is stiff. The discharge results are the following:

| | | |
|---|---|---|
| Starting voltage, unloaded | volts | 5.07 |
| Starting voltage, loaded | do | 4.77 |
| Discharge time down to 2.5 volts | hours | 3¼ |
| Total discharge time down to 1.8 volts | do | 7 |

In these tests, the discharged cells when opened show but very small traces of the zinc chloride ammonium chloride double salt, the formation of which is so much dreaded because it reduces the storage stability. The paste was still almost completely in the same wet state as in the beginning.

*Example 13*

Cells of pocket lamp type were made, in which the paste of the outer electrolyte according to general practice contains 20% of pure wheat flour. The electrolyte is stiff. The discharge results are:

| | | |
|---|---|---|
| Starting voltage, unloaded | volts | 4.92 |
| Starting voltage, loaded | do | 4.53 |
| Discharge time down to 2.5 volts | hours | 3 |
| Total discharge time down to 1.8 volts | do | 6½ |

In this case, the discharged cells when opened show the formation of the zinc chloride ammonium chloride double salt in numerous places. The room between the zinc cylinder and the puppet, corresponding to the known limited storage stability of these batteries, was already partly hardened.

Also for the magnesium chloride process, the lignin gel is excellently suited, as the following example shows:

*Example 14*

Magnesium chloride electrolyte cells of the pocket lamp type are made, the paste of the outer electrolyte containing about 20% of a mixture of 66.6% lignin gel and 33.3% good wheat flour. The electrolyte is stiffened by warming. The discharge results are:

Starting voltage, unloaded _____ volts__ 5.43
Starting voltage, loaded _____ do____ 4.83
Total discharge time _____ hours__ 4¼

This shows that with batteries of the magnesium chloride type having an additional contents of lignin gel, the discharging time is about 20-25% higher than usual, since batteries containing only flour paste, as a rule will be discharged within 3-3¼ hours. The discharged cells, after being opened do not show the least unfavourable changes. Also with this type of batteries, a complete substitution of the wheat flour by the lignin gel is by all means possible. Under these circumstances, one may also omit the heating of the electrolyte to make it stiff, as mentioned in Example 14.

Furthermore, we have found that these lignin masses capable of swelling are also suitable additions to electrolytes in electrolyte condensers, and that in this way glycerine or similar thickening agents used for this purpose, like glycol and ammonium glycerophosphate, may be partly or completely substituted.

Example 15

For instance the prescription given in the book of Güntherschulze-Betz, "Electrolyte Condensers," Berlin W. 35 (1937), p. 103, will be changed so as to give the electrolyte the following composition:

Glycerine _____ cc____ 40
Water _____ cc____ 72
Potassium-biphosphate _____ g____ 4
Citric acid _____ g____ 4
6-n-ammonia water _____ cc____ 1.7
Lignin gel, purified by electrofiltration ____ g____ 15

A completely homogeneous paste is obtained, having a viscosity higher than that of the corresponding mixture with pure glycerine.

Example 16

Water _____ cc____ 100
Potassium-biphosphate_____ g____ 4
Citric acid _____ g____ 4
6-n-ammonia water_____ cc____ 1.7
Gel, purified by electrofiltration _____ g____ 20

The paste is very stiff already.

Example 17

Water _____ cc____ 90
Glycol_____ cc____ 10
Potassium-biphosphate _____ g____ 4
Citric acid _____ g____ 4
6-n-ammonia water _____ cc____ 1.7
Gel, purified by electrofiltration _____ g____ 17

The paste is absolutely homogeneous and more viscous than the corresponding solution prepared with glycol alone.

According to these examples, one may also prepare pastes with other electrolyte additions.

What we claim is:

1. A mass capable of swelling and thickening comprising the precipitation—product of concentrated sulphite—lye with an excessive quantity of a strong mineral acid selected from the group consisting of hydrochloric acid and sulphuric acid, the mass being practically insoluble in water and possessing a limited and reversible swelling capacity.

2. The process of making a mass capable of swelling and thickening which comprises treating a concentrated sulphite lye with an excessive quantity of a strong mineral acid selected from the group consisting of hydrochloric acid and sulphuric acid.

3. The process of making a mass capable of swelling and thickening which comprises treating a concentrated sulphite lye with an excessive quantity of a strong sulphuric acid.

4. The process of making a mass capable of swelling and thickening which comprises treating a concentrated sulphite lye with an excessive quantity of a strong sulphuric acid whereupon the mixture solidifies to form a gelatinous mass upon standing.

5. The process of making a mass capable of swelling and thickening which comprises treating a concentrated sulphite lye with an excessive quantity of a strong mineral acid selected from the group consisting of hydrochloric acid and sulphuric acid, and separating the deposit from the mother lye.

6. The process of making a mass capable of swelling and thickening which comprises treating a concentrated sulphite lye with an excessive quantity of a strong mineral acid selected from the group consisting of hydrochloric acid and sulphuric acid, separating the deposit from the mother lye and washing it with water.

7. The process of making a mass capable of swelling and thickening which comprises treating a concentrated sulphite lye with an excessive quantity of a strong mineral acid selected from the group consisting of hydrochloric acid and sulphuric acid, separating the deposit from the mother lye, washing it with water and cautiously drying it.

8. The process of making a mass capable of swelling and thickening which comprises treating a concentrated sulphite lye with an excessive quantity of a strong mineral acid selected from the group consisting of hydrochloric acid and sulphuric acid and treating the deposit with an alkaline solution.

9. The process of making a mass capable of swelling and thickening which comprises treating a concentrated sulphite lye with an excessive quantity of a strong mineral acid selected from the group consisting of hydrochloric acid and sulphuric acid, treating the deposit with an alkaline solution, and removing the alkali by treatment with water.

10. The process of making a mass capable of swelling and thickening which comprises treating a concentrated sulphite lye with an excessive quantity of a strong mineral acid selected from the group consisting of hydrochloric acid and sulphuric acid, treating the deposit with an alkaline solution, removing the alkali by treatment with water, and cautiously drying the mass.

11. The process of making a mass capable of swelling and thickening which comprises treating a concentrated sulphite lye with an excessive quantity of a strong mineral acid selected from the group consisting of hydrochloric acid and sulphuric acid, and swelling the deposit with polyhydric alcohols.

12. A mass capable of swelling and thickening, comprising a lignin-product practically insoluble in water and possessing a limited and reversible swelling capacity in the presence of water to occupy at least eight times the volume of the dry mass.

13. A gelatinous mass having a definite and reversible capacity for swelling to at least eight times its dry volume upon treatment with water, and comprising the reaction product of a highly concentrated by-product sulphite cellulose liquor and an excess amount of a strong non-oxidizing mineral acid selected from the group consisting of hydrochloric acid and sulphuric acid.

14. A new composition of matter having a definite and reversible capacity for swelling to at least eight times its dry volume upon treatment with water, and produced by treating highly concentrated by-product sulphite cellulose liquor with an excess amount of strong non-oxidizing mineral acid selected from the group consisting of hydrochloric acid and sulphuric acid, and then permitting the mixture to set to a gelatinous mass.

RICHARD MÜLLER.
HARRY LEE.